United States Patent [19]

Yoshida et al.

[11] Patent Number: 4,548,964
[45] Date of Patent: Oct. 22, 1985

[54] FLAME-RETARDANT POLYESTER RESIN COMPOSITION

[75] Inventors: Tomohiko Yoshida, Kamakura; Hiroshi Mori, Iwakuni, both of Japan

[73] Assignee: Mitsubishi Rayon Co., Ltd., Tokyo, Japan

[21] Appl. No.: 679,639

[22] Filed: Dec. 10, 1984

[30] Foreign Application Priority Data

Dec. 27, 1983 [JP] Japan ................................ 58-248618

[51] Int. Cl.[4] .............................................. C08K 5/10
[52] U.S. Cl. .................................... 523/455; 524/310; 524/311; 524/317; 524/605
[58] Field of Search ................ 523/455; 524/310, 311, 524/317

[56] References Cited

U.S. PATENT DOCUMENTS

| | | | |
|---|---|---|---|
| 4,327,007 | 4/1982 | Vanderkooi et al. | 523/455 |
| 4,421,887 | 12/1983 | Horie et al. | 524/317 |
| 4,448,913 | 5/1984 | Coleman et al. | 523/455 |

FOREIGN PATENT DOCUMENTS 55-52314  4/1980  Japan .................................. 523/455

*Primary Examiner*—Lewis T. Jacobs
*Attorney, Agent, or Firm*—Oblon, Fisher, Spivak, McClelland & Maier

[57] ABSTRACT

Disclosed is a flame-retardant polyester resin composition comprising (1) a reinforced resin composition obtained by melt blending (A) a polyethylene terephthalate resin, (B) glass fibers, a combination of (C) at least one flame retarder having a specified chemical structure and (D) hexabromobiphenyl ether used in specific proportions, (E) antimony trioxide and optionally (F) an inorganic filler; and (2) (G) at least one ester compound subsequently added to the reinforced resin composition, the ester compound being derived from pentaerythitol and a fatty acid. This flame-retardant polyester resin composition can yield molded articles having excellent mechanical properties and flame retardancy, and exhibits good releasability of the molded article and rapid feed into the molding machine at the time of molding.

4 Claims, No Drawings

FLAME-RETARDANT POLYESTER RESIN COMPOSITION

BACKGROUND OF THE INVENTION

1. Field of the Invention

This invention relates to flame-retardant polyester resin compositions. More particularly, it relates to a flame-retardant polyester resin composition having excellent mechanical properties and thermal resistance and also exhibiting good releasability of the molded article and rapid feed of resin chips into the molding machine at the time of molding.

2. Description of the Prior Art

Polyethylene terephthalate resins reinforced with glass fibers are being widely used as engineering plastics because of their excellent resin properties such as mechanical properties, thermal resistance, chemical resistance and moldability.

However, similar to other synthetic resins, such glass-fiber reinforced polyester resins involve the problem of flammability, it is of great importance to impart flame retardancy to them.

Since glass-fiber reinforced polyethylene terephthalate resins are usually molded at a relatively high temperature of 250° to 300° C., the thermal resistance of the flame retarder added thereto is important. Thus, it is necessary to use a flame retarder which barely decomposes even at elevated temperatures and, moreover, causes neither discoloration of the finally obtained molded articles nor degradation of the resin properties. Since glass-fiber reinforced polyethylene terephthalate resins have high heat distortion temperatures, they are being widely used as materials for the manufacture of products (such as electrical parts) for use in high-temperature environments. Accordingly, in imparting flame retardancy to such glass-fiber reinforced polyester resins, it is important that they not only have excellent initial properties such as flame retardancy, mechanical strength and thermal resistance, but also show no degradation of the flame retardancy due to the thermal escape of the flame retarder even after they have been utilized under a high-temperature atmosphere for a long period of time. In other words, thermal stability of the molded articles is required.

Since a flame retarder (C) as described later is excellent in, for example, thermal resistance and flame-retardant properties, the present inventors attempted to incorporate a combination of this flame retarder (C) and antimony trioxide into a glass-fiber reinforced polyethylene terephthalate resin and thereby improve its flame retardancy. When the flame retarder (C) was added in small amounts, the resulting composition had excellent performance as a result of improvement not only in flame retardancy but also in mechanical properties. However, when the flame retarder (C) was incorporated with a view to achieving a higher degree of flame retardancy, the resulting composition showed a decrease in flow properties and hence moldability under certain molding conditions (for example, when the injection molding temperature was raised or when the residence time was prolonged).

Furthermore, it is very important from the viewpoint of economy to shorten the time elapsed until the molded article is taken out of the mold, or the molding cycle. In practice, this is usually accomplished by shortening the injection time and the cooling time as much as possible. However, since the cooling time depends largely on the size and thickness of the molded article, the molding cycle is practically governed by the time required for feeding a predetermined amount of chips, termed the feed time. Accordingly, the molding cycle can be expected to become shorter if the feed time is reduced.

SUMMARY OF THE INVENTION

It is an object of the present invention to provide a flame-retardant polyester resin composition which, at the time of molding, exhibits good releasability of the molded article from the mold and rapid feed into the molding machine.

It is another object of the present invention to provide a flame-retardant polyester resin composition which can yield molded articles having excellent mechanical properties, thermal resistance and anti-dripping properties.

The above and other objects of the present invention are accomplished by a flame-retardant polyester resin composition comprising (1) a reinforced resin composition obtained by melt blending
   (A) a polyethylene terephthalate resin,
   (B) glass fibers,
   (C) at least one flame retarder of the general formula

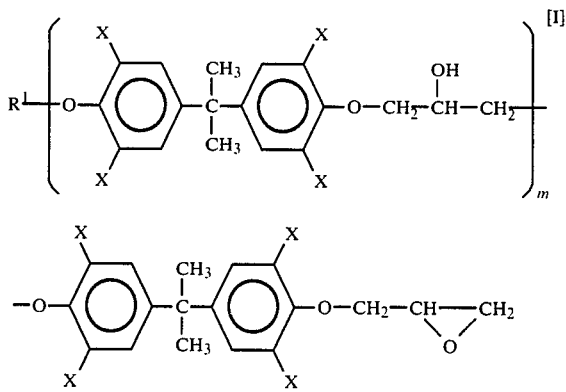

where X independently represents a hydrogen, chlorine or bromine atom, m has an average value of 0 to 11, and $R^1$ represents a glycidyl radical, a radical of the formula

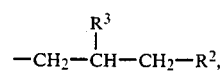

a hydrocarbon radical, a halogenated hydrocarbon radical or a radical of the formula $-COR^4$ where one of $R^2$ and $R^3$ is a hydroxyl group and the other is an alkoxy, phenoxy, amino or carboxyl group which may have one or more halogen substituents, and $R^4$ is a hydrocarbon or halogenated hydrocarbon radical, the flame retarder having a halogen content of not less than 10% by weight, (D) hexabromobiphenyl ether, and (E) antimony trioxide, the reinforced resin composition containing, per 100 parts by weight of component (A), 1 to 20 parts by weight of component (C), 2 to 30 parts by weight of component (D) and 2 to 30 parts by weight of component (E), the weight ratio of component (C) to component (D) being in the range of $0.2 < (C)/(D) \leq 4$ and the combined amount of components (C) and (D) being 3 to 40 parts by weight, the content of component (B) being 5 to 60% by weight based on the weight of the reinforced resin composition; and (2) (G) at least one ester compound subsequently added to the reinforced resin composition in an amount of 0.01 to 2% by weight based on the weight of the reinforced resin composition, the ester compound being of the formula

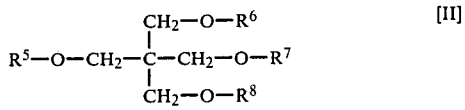

where $R^5$ to $R^8$ are hydrogen atoms or alkanoyl radicals of the formula $-COC_nH_{2n+1}$ ($n=10-30$), provided that not all of $R^5$ to $R^8$ are hydrogen atoms.

Moreover, the flame retardancy of the polyester resin composition and, in particular, its antidripping properties at the time of burning can further be improved by incorporating thereinto an inorganic filler in an amount of 1 to 60% by weight based on the weight of the reinforced resin composition.

DETAILED DESCRIPTION OF THE PREFERRED EMBODIMENTS

The polyethylene terephthalate resin (A) used in the present invention is selected from the group consisting of linear polyesters composed chiefly of ethylene terephthalate units; linear copolyesters obtained by copolymerizing ethylene glycol and terephthalic acid with minor amounts of other polyhydric alcohols, aromatic dicarboxylic acids or aliphatic dicarboxylic acids; mixtures composed of a major amount of such a polyester or copolyester and a minor amount of other thermoplastic material. Preferably, the intrinsic viscosities [η] of the linear polyesters and linear copolyesters are in the range of 0.4 to 1.5 as measured at 25° C. in a solvent mixture consisting of tetrachloroethane and phenol in a weight ratio of 1:1.

No particular limitation is placed on the type of the glass fibers (B) used in the present invention, and they can be of either the roving type or chopped strand type. However, it is preferable from the viewpoint of productivity to use glass fibers of chopped strand type. In this case, glass fibers having lengths of the order of 0.4 to 6 mm are particularly preferred in consideration of, for example, workability for blending operation, wear of the molding machine and breakage during the molding process, so that the glass fibers present in the finally obtained molded articles will have lengths of the order of 0.2 to 3 mm. Commercially available glass fibers which have undergone various treatments may be used as they are. The glass fibers are used in an amount of 5 to 60% by weight based on the weight of the reinforced resin composition consisting of the polyethylene terephthalate resin (A), glass fibers (B), flame retarder (C), hexabromobiphenyl ether (hereinafter referred to as HBBE), (D), antimony trioxide (E) and optionally an inorganic filler (F). If the amount of glass fibers used is less than 5% by weight, the glass fibers will produce little reinforcing effect, while if the amount is greater than 60% by weight, the resulting composition will undesirably show a decrease in moldability as seen from the viewpoint of flow properties.

The flame retarders used in the present invention comprise a combination of at least one flame retarder (C) of the aforesaid general formula [I] and HBBE (D) which are used in specific proportions.

It is important that the average degree of polymerization of the flame retarder (C) as represented by m in the general formula [I] have a value of 11 or less. If a high-molecular-weight flame retarder in which the value of m is greater than 11 is used, this flame retarder (C) may fail to become evenly dispersed in the resin composition, resulting in an undesirable degradation of the resin properties. Moreover, if the halogen content of the flame retarder (C) is less than 10% by weight, it will be difficult to obtain a sufficient degree of flame retardancy, and if the amount of flame retarder (C) used is excessively great, there may be an undesirable tendency for the resin properties and anti-dripping properties to be degraded.

Specific examples of the flame retarder (C) include:

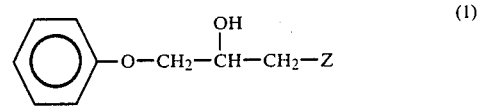 (1)

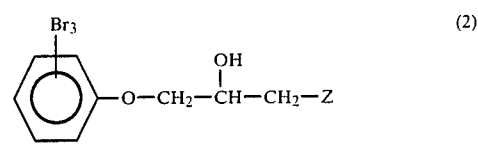 (2)

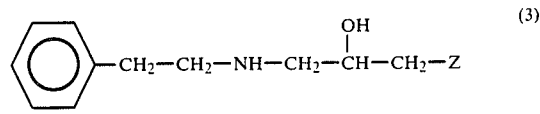 (3)

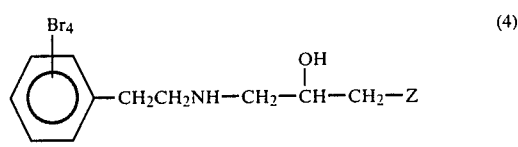 (4)

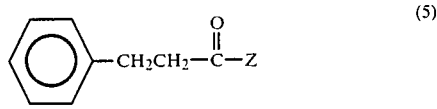 (5)

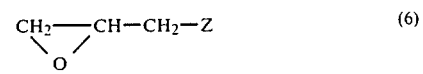 (6)

In the above formulas, Z represents

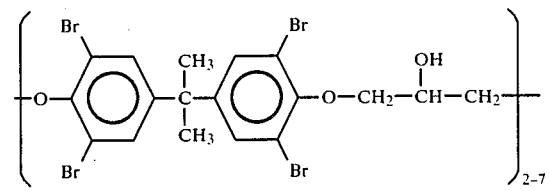

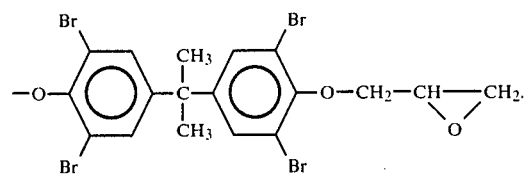

The other flame retarder which is used in combination with the flame retarder (C) must be HBBE (D). It is not desirable to use decabromobiphenyl ether which is analogous to HBBE but is different in bromine content. This is because, when a molded article containing decabromobiphenyl ether is exposed to elevated temperatures, the decabromobiphenyl ether blooms to the surface of the molded article and looks like a white powder. In contrast, HBBE barely escapes even at elevated temperatures and causes no change in the surface of the molded articles.

The amounts of flame retarders used should be such that the flame retarder (C) and HBBE (D) are present in amounts of 1 to 20 parts by weight and 2 to 30 parts by weight, respectively, per 100 parts by weight of the polyethylene terephthalate resin (A), the weight ratio of the flame retarder (C) to HBBE (D) is in the range of $0.2 < (C)/(D) \leq 4$, and the combined amount of the flame retarder (C) and HBBE (D) is 3 to 40 parts by weight.

Antimony trioxide (E) is used in an amount of 2 to 30 parts by weight, preferably 3 to 20 parts by weight, per 100 parts by weight of the polyethylene terephthalate resin (A). If the amount of antimony trioxide used is greater than 30 parts by weight, the resulting composition will show an undesirable decrease in mechanical properties.

The ester compound (G) used in the present invention is selected from the group consisting of ester compounds obtained by the reaction of pentaerythritol with a saturated aliphatic monocarboxylic acid having an alkyl chain of 10 to 30 carbon atoms. Examples of the saturated aliphatic monocarboxylic acid include lauric acid, myristic acid, palmitic acid, stearic acid, arachic acid, cerotic acid, melissic acid and n-hentriacontanoic acid. In these ester compounds, the four alcohol groups of the pentaerythritol may be totally or partially esterified. These compounds may be used either alone or in admixture.

In the practice of the present invention, the above-defined ester compound is used in an amount within the aforesaid range. If the amount of ester compound used is less than 0.01% by weight, the resulting composition show no significant improvement in feedability. If it is greater than 2% by weight, the resulting composition is rather inferior in feedability to compositions containing no such ester compounds. The manner in which the ester compound is added is a factor important to the polyester resin composition of the present invention. If the ester compound is blended with the aforesaid polyethylene terephthalate resin, glass fibers, flame retarders and optionally an inorganic filler as described below, the resulting composition will not a significant improvement in feedability. In other words, in order to achieve significant improvements in feedability and releasability at the time of molding, a polyester resin composition must be prepared by melt blending the aforesaid polyethylene terephthalate resin, glass fibers, flame retarders and optionally an inorganic filler as described below to form a reinforced resin composition and by subsequently adding the ester compound to the reinforced resin composition.

Moreover, in accordance with the present invention, the flame retardancy and anti-dripping properties of the polyester resin composition can also be improved by incorporating an inorganic filler (F) into the reinforced resin composition. No particular limitation is placed on the type of the inorganic filler, but specific examples thereof include talc, kaolin, wollastonite, silica, mica, diatomaceous earth, ground quartz, clay and white carbon. Among these inorganic fillers, talc and white carbon are particularly preferred because the former is effective in improving moldability and the latter is markedly effective in improving anti-dripping properties. These inorganic fillers may be used either alone or in admixture of two or more.

The inorganic filler is used in an amount of 1 to 40% by weight based on the weight of the reinforced resin composition. If the amount of inorganic filler used is less than 1% by weight, it will be barely effective in improving anti-dripping properties. It is preferable that the glass fibers and the inorganic filler are used in a combined amount of 6 to 60% by weight based on the weight of the reinforced resin composition.

If necessary, the polyester resin composition of the present invention can further contain such additives as light or heat stabilizers, dyes, pigments and nucleating agents.

The present invention is further illustrated by the following examples. In these examples, all parts and percentages are by weight.

EXAMPLES 1-14 AND COMPARATIVE EXAMPLES 1-12

Into well-dried polyethylene terephthalate having an intrinsic viscosity of 0.72 as measured at 25° C. in a solvent mixture consisting of tetrachloroethane and phenol in a weight ratio of 1:1, sodium benzoate (as a nucleating agent), chopped glass fiber strands of 3 mm length, flame-retarders, antimony trioxide and an inorganic filler were incorporated in the proportions given in Tables 1 and 2 below. This was accomplished by mixing the ingredients intimately in a V-type blender for 5 minutes.

Using a 40 mm$\phi$ vented extruder, the resulting mixtures were extruded at a cylinder temperature of 260°-280° C. to obtain reinforced resin compositions in the form of pellets.

Each of the ester compounds shown in Tables 1 and 2 was added to the corresponding reinforced resin composition and intimately mixed therewith in a V-type blender for 3 minutes to obtain molding pellets. These molding pellets were dried in hot air at 130° C. for 12 hours and then injection molded with a 30 mm$\phi$, 3-ounce screw in-line type injection molding machine, using a cylinder temperature of 280° C. and a mold temperature of 80° C. Thus, there were obtained specimens for a flexural strength test having a thickness of 3.2 mm and specimens for a flammability test having a thickness of 1.5 mm. The molding cycle was 120 seconds.

Feedability, releasability, moldability and heat distortion temperature (hereinafter referred to as HDT) were evaluated according to the procedures given below.

FEEDABILITY

A sample of the aforesaid molding pellets was dried in hot air at 150° C. for 4 hours and immediately molded with a 3-ounce injection molding machine, using a cylinder temperature of 280° C., a mold temperature of 80° C. and a cooling time of 30 seconds. Thus, a molded piece (weighing 68 g) capable of providing an ASTM No. 1 dumbbell and a specimen for an Izod impact test was formed. The feed time (or plasticizing time) required to form this molded piece was measured. Shorter feed times indicate higher feedability.

RELEASABILITY

A sample of the aforesaid molding pellets was dried in hot air at 150° C. for 4 hours and immediately molded into a box-shaped article (having external dimensions of 100 mm long, 120 mm wide and 40 mm high) with an 8-ounce injection molding machine, using a cylinder temperature of 280° C., a mold temperature of 140° C. and a cooling time of 30 seconds. The mold used in this test had a pressure sensor (strain gauge) disposed between the ejector plate and the ejector pin so that, when the mold was opened after completion of each molding cycle, the force required to eject the molded article (hereinafter referred to as ejection resistance) could be detected with a photographic instrument. Lower ejection resistance indicates better releasability.

MOLDABILITY

A sample of the aforesaid molding pellets was dried in hot air at 150° C. for 4 hours and immediately molded with an 8-ounce injection molding machine, using a cylinder temperature of 280° C., a mold temperature of 140° C. and a cooling time of 30 seconds. The molding cycle was as long as 120 seconds and moldability was evaluated by examining whether or not short shot occurred under severe conditions as defined by this longer molding cycle than usual. More specifically, the initial injection pressure was set at 150 kg/cm² higher than the pressure at which short shot would occur. Then, the number of shots at which short shot occurred as a result of the increase in melt viscosity during the molding process was determined and rated as follows:

O: No short shot occurred.
Δ: Short shot occurred at the 11th or later shot.
X: Short shot occurred between the 1st and the 10th shot.

MEASUREMENT OF HDT

A sample of the aforesaid molding pellets was dried in hot air at 150° C. for 4 hours and immediately molded with a 3-ounce injection molding machine, using a cylinder temperature of 280° C., a mold temperature of 140° C. and a cooling time of 30 seconds. Thus, a strip specimen measuring 127 mm × 12.7 mm × 3.2 mm was made and its heat distortion temperature was measured according to ASTM D648 (under a load of 18.6 kg/cm²).

The results of the aforesaid various tests are shown in Tables 1 and 2. The values for flexural strength given in these tables were measured according to ASTM D638. Flame retardancy was evaluated according to the flammability test procedure described in Underwriters' Laboratories Bulletin 94 (UL-94). Ten ignition tests were performed on 5 specimens measuring 127 mm × 12.7 mm × 1.5 mm.

In the tables, the flame retarders (I) to (IV) represents the flame retarders of the following formula:

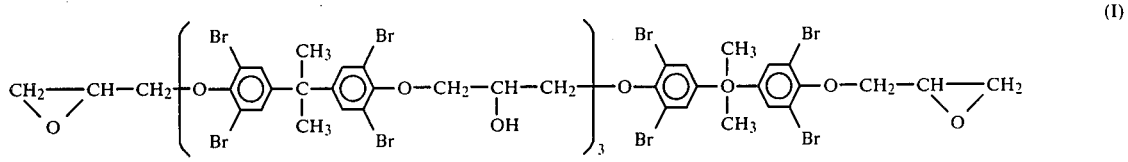

(halogen content: 52.1% by weight)

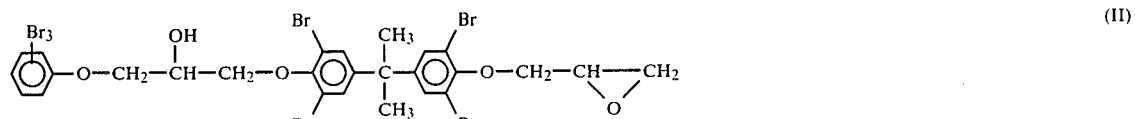

(Halogen content: 56.4% by weight)

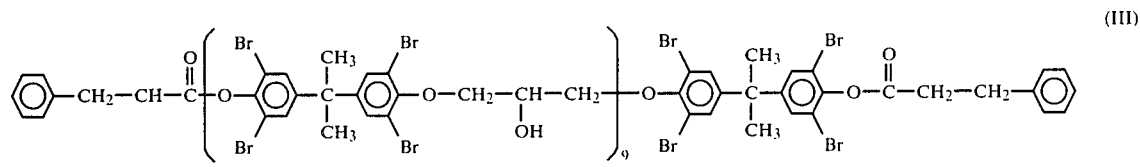

(Halogen content: 51.2% by weight)

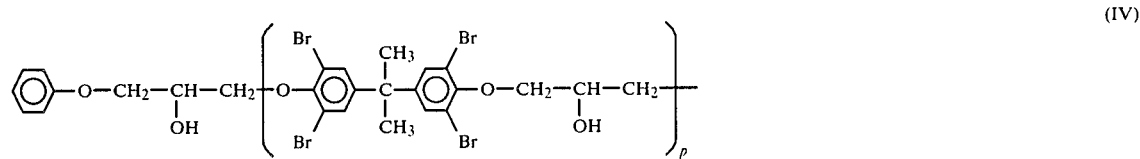

(Halogen content: 5.0% by weight)

and the flame retarder (V) represents HBBE.

TABLE 1

| Example | PET (parts) | Glass fibers (parts) | Sodium benzoate (parts) | Flame retarders Type | Flame retarders Amount (parts) | Antimony trioxide (parts) | Inorganic filler Type | Inorganic filler Amount (parts) | Ester compound Type | Ester compound Amount (%)[*1] |
|---|---|---|---|---|---|---|---|---|---|---|
| 1 | 100 | 58 | 0.2 | (I)/(V) | 6/24 | 10 | — | — | Pentaerythritol tetrastearate | 0.2 |
| 2 | " | " | " | " | 14/4 | " | — | — | Pentaerythritol tetrastearate | " |
| 3 | " | " | " | " | 12/12 | " | — | — | Pentaerythritol tetrastearate | " |
| 4 | " | " | " | " | " | " | — | — | Pentaerythritol tetrastearate | 0.01 |
| 5 | " | " | " | " | " | " | — | — | Pentaerythritol tetrastearate | 1.5 |
| 6 | " | " | " | (II)/(V) | " | " | — | — | Pentaerythritol tetrastearate | 0.2 |
| 7 | " | " | " | (III)/(V) | " | " | — | — | Pentaerythritol tetrastearate | " |
| 8 | " | " | " | (I)/(V) | " | " | — | — | Pentaerythritol tristearate | " |
| 9 | " | " | " | " | 2/2 | " | — | — | Pentaerythritol distearate | " |
| 10 | " | " | " | " | 18/18 | " | — | — | Pentaerythritol monostearate | " |
| 11 | " | " | " | " | 12/12 | " | — | — | Pentaerythritol dipalmitate | " |
| 12 | " | " | " | " | " | " | — | — | Pentaerythritol dimontanate | " |
| 13 | " | " | " | " | " | " | Talc | 20 | Pentaerythritol tetrastearate | " |
| 14 | " | " | " | " | " | " | White carbon | 4 | Pentaerythritol tetrastearate | " |

| Example | Flame retardancy Number of drips | Flame retardancy Number of ignitions | Flame retardancy Average burning time (sec) | Flame retardancy Judgement | Moldability | Flexural strength (kg/cm$^2$) | Feed time (sec) | Releasability (ejection resistance (kg/cm$^2$)) | HDT at 18.6 kg/cm$^2$ (1/8") (°C.) |
|---|---|---|---|---|---|---|---|---|---|
| 1 | 5 | 0 | 2.4 | V-O | O | 1,870 | 13.4 | 92 | 230 |
| 2 | 6 | " | 2.5 | " | O | 2.020 | 13.3 | 91 | 220 |
| 3 | 5 | " | 2.2 | " | O | 1,950 | " | " | 230 |
| 4 | " | " | " | " | O | 1,980 | 14.0 | 109 | " |
| 5 | " | " | " | " | O | 1,900 | 14.7 | 71 | " |
| 6 | " | " | " | " | O | 1,930 | 13.3 | 91 | " |
| 7 | " | " | " | " | O | 1,950 | " | 90 | " |
| 8 | " | " | " | " | O | 1,930 | 13.2 | " | " |
| 9 | 7 | " | 2.7 | " | O | 1,920 | 13.5 | 89 | " |
| 10 | 4 | " | 2.0 | " | O | 1,850 | 13.2 | 91 | " |
| 11 | 5 | " | 2.2 | " | O | 1,920 | " | 92 | " |
| 12 | " | " | " | " | O | 1,930 | 13.3 | " | " |
| 13 | 2 | " | 1.7 | " | O | 1,880 | 13.5 | " | " |
| 14 | 1 | " | 1.5 | " | O | 1,820 | 13.3 | 90 | " |

[*1] Based on the weight of the reinforced resin composition.

TABLE 2

| Example | PET (parts) | Glass fibers (parts) | Sodium benzoate (parts) | Flame retarders Type | Flame retarders Amount (parts) | Antimony trioxide (parts) | Inorganic filler Type | Inorganic filler Amount (parts) | Ester compound Type | Ester compound Amount (%)[*1] |
|---|---|---|---|---|---|---|---|---|---|---|
| 1 | 100 | 58 | 0.2 | (I) | 20 | 10 | — | — | Pentaerythritol tetrastearate | 0.2 |
| 2 | " | " | " | (I)/(V) | 12/12 | " | — | — | — | — |
| 3 | " | " | " | " | 1.2/12 | " | — | — | Pentaerythritol tetrastearate | 0.2 |
| 4 | " | " | " | " | 24/4 | " | — | — | Pentaerythritol tetrastearate | " |
| 5 | " | " | " | " | 0.5/0.5 | " | — | — | Pentaerythritol tetrastearate | " |
| 6 | " | " | " | " | 30/20 | " | — | — | Pentaerythritol tetrastearate | " |
| 7 | " | " | " | (IV)/(V) | 12/12 | " | — | — | Pentaerythritol tetrastearate | " |
| 8 | " | " | " | (I)/(V) | " | " | — | — | Pentaerythritol tetrastearate | 0.001 |
| 9 | " | " | " | (V) | 25 | " | — | — | Pentaerythritol tetrastearate | 0.2 |
| 10 | " | " | " | (I)/(V) | 12/12 | " | — | — | Pentaerythritol tetrastearate | 3.0 |
| 11 | " | " | " | " | " | " | Talc | 300 | Pentaerythritol tetrastearate | 0.2 |

TABLE 2-continued

| Example | Flame retardancy ||||  Mold-ability | Flexural strength (kg/cm²) | Feed time (sec) | Releasability (ejection resistance (kg/cm²) | HDT at 18.6 kg/cm² (1/8") (°C.) |
|---|---|---|---|---|---|---|---|---|---|
| | Number of drips | Number of ignitions | Average burning time (sec) | Judgement | | | | | |
| 12 | " | " | " | " | " | " | 20 | Pentaerythritol tetrastearate 0.2*² | |
| 1 | 7 | 0 | 2.7 | V-0 | Δ | 2,050 | 13.5 | 90 | 200 |
| 2 | 5 | 0 | 2.2 | " | O | 1,990 | 16.0 | 132 | 230 |
| 3 | 6 | 0 | 2.3 | " | O | 1,750 | 13.6 | 91 | " |
| 4 | 5 | 0 | 2.2 | " | X | 2,200 | 13.5 | 90 | 198 |
| 5 | 15 | 10 | 6.0 | not ranked | O | 1,760 | 13.6 | 89 | 230 |
| 6 | 4 | 0 | 2.0 | V-0 | X | 2,250 | 13.7 | 90 | 185 |
| 7 | 8 | 8 | 12 | V-II | O | 1,950 | 13.6 | " | 220 |
| 8 | 5 | 0 | 2.2 | V-0 | O | 1,980 | 16.0 | 131 | 230 |
| 9 | 8 | 0 | 3.7 | " | X | 1,690 | 13.4 | 92 | 232 |
| 10 | 5 | 0 | 2.2 | " | O | 1,620 | 16.7 | 67 | 230 |
| 11 | 2 | 0 | 1.9 | " | X | 1,550 | 13.2 | 93 | " |
| 12 | 2 | 0 | 1.7 | " | O | 1,850 | 16.0 | 120 | " |

*¹Based on the weight of the reinforced resin composition.
*²Initially added to the reinforced resin composition.

It may be seen from the above results that a flame-retardant polyester resin composition having excellent flame retardancy, mechanical properties, thermal resistance, releasability and feedability can be obtained by incorporating the flame retarder (C) and HBBE in specific proportions and subsequently adding an ester compound derived from pentaerythritol. It may also be seen that the flame retardancy of the composition and, in particular, its anti-dripping properties can further be improved by incorporating an inorganic filler thereinto.

What is claimed is:

1. A flame-retardant polyester resin composition comprising
(1) a reinforced resin composition obtained by melt blending
(A) a polyethylene terephthalate resin,
(B) glass fibers,
(C) at least one flame retarder of the general formula

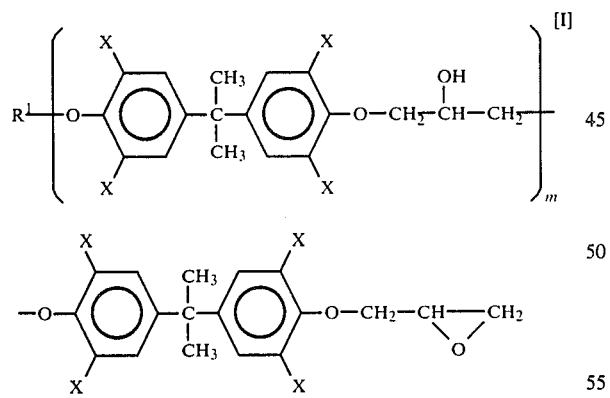

where X independently represents a hydrogen, chlorine or bromine atom, m has an average value of 0 to 11, and $R^1$ represents a glycidyl radical, a radical of the formula

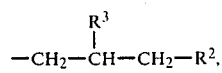

a hydrocarbon radical, a halogenated hydrocarbon radical or a radical of the formula —$COR^4$ where one of $R^2$ and $R^3$ is a hydroxyl group and the other is an alkoxy, phenoxy, amino or carboxyl group which may have one or more halogen substituents, and $R^4$ is a hydrocarbon or halogenated hydrocarbon radical, the flame retarder having a halogen content of not less than 10% by weight.
(D) hexabromobiphenyl ether, and
(E) antimony trioxide, the reinforced resin composition containing, per 100 parts by weight of component (A), 1 to 20 parts by weight of the component (C), 2 to 30 parts by weight of component (D) and 2 to 30 parts by weight of component (E), the weight ratio of component (C) to component (D) being in the range of $0.2 < (C)/(D) \leq 4$ and the combined amount of components (C) and (D) being 3 to 40 parts by weight, the content of component (B) being 5 to 60% by weight based on the weight of the reinforced resin composition; and (2) (G) at least one ester compound subsequently added to the reinforced resin composition in an amount of 0.01 to 2% by weight based on the weight of the reinforced resin composition, the ester compound being of the formula

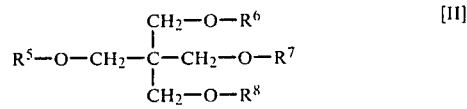

where $R^5$ to $R^8$ are hydrogen atoms or alkanoyl radicals of the formula —$COC_nH_{2n+1}$ (n=10-30), provided that not all of $R^5$ to $R^8$ are hydrogen atoms.

2. The flame-retardant polyester resin composition of claim 1 wherein (F) an inorganic filler is incorporated into the reinforced resin composition in an amount of 1 to 40% by weight based on the weight of the reinforced resin composition.

3. The flame-retardant polyester resin composition of claim 1 or 2 wherein the polyethylene terephthalate resin is selected from the group consisting of linear polyesters composed chiefly of ethylene terephthalate units, linear copolyesters obtained by copolymerizing ethylene glycol and terephthalic acid with minor amounts of other polyhydric alcohol, aromatic dicarboxylic acid and/or aliphatic dicarboxylic acid, and mixtures composed of a major amount of any of these polyesters or copolyesters and a minor amount of other thermoplastic resins, the intrinsic viscosity of the polyethylene terephthalate resin being in the range of 0.4 to 1.5 as measured at 25° C. in a solvent mixture consisting of tetrachloroethylene and phenol in a weight ratio of 1:1.

4. The flame-retardant polyester composition of claim 2 wherein the inorganic filler is at least one member selected from the group consisting of talc, kaolin, wollastonite, silica, mica, diatomaceous earth, ground quartz, clay and white carbon.

* * * * *